United States Patent
Akashi et al.

(10) Patent No.: US 8,945,439 B2
(45) Date of Patent: Feb. 3, 2015

(54) METHOD FOR MANUFACTURING LENS, APPARATUS FOR MANUFACTURING LENS, AND METHOD FOR MANUFACTURING OPTICAL APPARATUS

(75) Inventors: Kenichi Akashi, Kawasaki (JP); Toshiki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 13/225,991

(22) Filed: Sep. 6, 2011

(65) Prior Publication Data
US 2012/0061864 A1  Mar. 15, 2012

(30) Foreign Application Priority Data
Sep. 10, 2010  (JP) ................. 2010-203368

(51) Int. Cl.
*B29D 11/00* (2006.01)

(52) U.S. Cl.
USPC .......... 264/1.36; 264/1.38; 264/1.7; 264/408; 356/73.1

(58) Field of Classification Search
USPC ............... 264/1.36, 1.37, 1.38, 406, 408, 1.7; 356/73.1
See application file for complete search history.

(56) References Cited

U.S. PATENT DOCUMENTS 4,468,118 A * 8/1984 Bice ............................ 356/73.1

FOREIGN PATENT DOCUMENTS

| JP | 58-98316 A | 6/1983 |
| JP | 7-40357 A | 2/1995 |

* cited by examiner

*Primary Examiner* — Mathieu D. Vargot
(74) *Attorney, Agent, or Firm* — Canon USA, Inc. IP Division

(57) ABSTRACT

A method for manufacturing a lens having a refractive index distribution includes: a step of contacting a monomer with a structural member of a polymer, the monomer and a material obtained by polymerization of the monomer showing refractive indices which are different from the refractive index of the polymer; a step of diffusing the contacted monomer in the structural member; and a step of polymerizing the monomer. In the step of diffusing the contacted monomer in the structural member, the method further includes the steps of: irradiating light on at least 50% of one of the surfaces of the structural member which is parallel to the diffusion direction of the monomer, and measuring the intensity of the light passing through the structural member in a predetermined region, and when the measured intensity of the light reaches a predetermined value, the step of polymerizing the monomer is started.

6 Claims, 5 Drawing Sheets

METHOD FOR MANUFACTURING LENS, APPARATUS FOR MANUFACTURING LENS, AND METHOD FOR MANUFACTURING OPTICAL APPARATUS

BACKGROUND OF THE INVENTION

1. Field of the Invention

The present invention relates to a method for manufacturing a lens, an apparatus for manufacturing a lens, and a method for manufacturing an optical apparatus.

2. Description of the Related Art

In a zoom lens of a camera, in order to correct a chromatic aberration, a plurality of lenses is used. On the other hand, when a radial gradient index lens having a refractive index distribution in a radial direction from an optical axis is used, even if the number of lenses is small, the chromatic aberration can be corrected. Therefore, when a radial gradient index lens is used, the reduction in size of a zoom lens can be realized.

A radial gradient index lens can be manufactured, for example, by forming a composition distribution from at least two types of monomers having different refractive indices. In particular, a concave or a convex plastic lens is obtained by the steps of heating a monomer injected in a casting mold to form a gel, holding another monomer in contact with the periphery of the gel for a predetermined time for diffusion, and subsequently heating the entire composite thus formed for curing (Japanese Patent Laid-Open No. 7-40357, hereinafter referred to as "Patent Document 1"). That is, the distribution of the refractive index is to be adjusted by changing the time for diffusion. In addition, a method of manufacturing a gradient index lens material has been disclosed in which polymerizable molecules are diffused in a cylindrical material composed of prepolymers with refractive index higher than that of the polymerizable molecules (Japanese Patent Laid-Open No. 58-98316, hereinafter referred to as "Patent Document 2"). In addition, in Patent Document 2, a laser beam is made incident at a position on one flat surface of the cylindrical material with an angle, a laser beam receiving device is provided so as to detect an position and an angle of a outgoing beam which outgoes from the other flat surface of the cylindrical material when the gradient in the concentration of the polymerizable molecules forms a predetermined refractive index distribution, and the diffusion of the polymerizable molecules is stopped when the outgoing beam is detected.

By the steps described above, a gradient index lens material can be manufactured with good reproducibility.

However, in the manufacturing method disclosed in Patent Document 1, when the diffusion rate of the another monomer is changed, for example, by a sudden change in temperature in a diffusion step, or when manufacturing is performed under conditions in which temperature control is difficult to perform, a lens having a desired refractive index distribution may not be obtained in some cases. In addition, in Patent Document 2, since thin light beams such as laser beams are used, it may not be detected that a desired refractive index distribution is not formed over the entire lens in some cases such that a refractive index distribution is formed in a certain portion but is not formed in the other portion.

SUMMARY OF THE INVENTION

Aspects of the present invention were made in consideration of the above problems, and provide a method for manufacturing a lens having a refractive index distribution, an apparatus for manufacturing a lens, and a method for manufacturing an optical device, each of which can obtain a lens having a desired refractive index distribution even if the change in temperature of a monomer suddenly occurs in a diffusion step, or manufacturing is performed under conditions in which temperature control is difficult to perform. In addition, aspects of the present invention also provide a method for manufacturing a lens having a desired refractive index distribution thereover.

In accordance with a first aspect of the present invention, there is provided a method for manufacturing a lens having a refractive index distribution which comprises: a step of contacting a monomer with a structural member of a polymer, the monomer and a material obtained by polymerization of the monomer showing refractive indices which are different from the refractive index of the polymer; a step of diffusing the contacted monomer in the structural member; and a step of polymerizing the monomer, wherein in the step of diffusing the contacted monomer in the structural member, the method further comprises the steps of irradiating light on at least 50% of one of the surfaces of the structural member which is parallel to the diffusion direction of the monomer, and measuring the intensity of the light passing through the structural member in a predetermined region, and when the measured intensity of the light reaches a predetermined value, the step of polymerizing the monomer is started.

In accordance with a second aspect of the present invention, there is provided an apparatus for manufacturing a lens having a refractive index distribution in which a monomer is contacted with a structural member of a polymer, the monomer and a material obtained by polymerization of the monomer showing refractive indices which are different from the refractive index of the polymer, the monomer thus contacted is held for a predetermined time for diffusion thereof to form a distribution in concentration of the monomer, and the monomer is then polymerized to form the lens, the apparatus comprising: a light irradiation device which irradiates light on at least 50% of one of the surfaces of the structural member parallel to the diffusion direction of the monomer while the monomer is diffused; a light intensity measurement device which measures the intensity of the light passing through the structural member; and a polymerization start device which starts polymerization of the monomer when the measured intensity of the light reaches a predetermined value.

In accordance with a third aspect of the present invention, there is provided a method for manufacturing an optical apparatus which comprises the steps of: providing a lens; and providing an imaging device for imaging light passing through the lens, wherein the lens is manufactured by the method according to the first aspect of the present invention.

According to the present invention, while the monomer is diffused in the structural member of the polymer, the structural member is irradiated with light, and light passing through the structural member is measured, so that, for example, the timing for starting polymerization of the monomer can be decided. Accordingly, even if a sudden temperature change of the monomer occurs in a diffusion step, or manufacturing is performed under conditions in which temperature control is difficult to perform, a method for manufacturing a lens having a refractive index distribution, an apparatus for manufacturing a lens, and a method for manufacturing an optical apparatus, each of which can obtain a lens having a desired refractive index distribution, can be provided. In addition, since at least 50% of one of the surfaces of the structural member which is parallel to the diffusion direction of the monomer is irradiated with light, a method for manufacturing a lens having a desired refractive index distribution thereover can be provided.

Further features of the present invention will become apparent from the following description of exemplary embodiments with reference to the attached drawings.

DESCRIPTION OF THE EMBODIMENTS

Figure 1A:
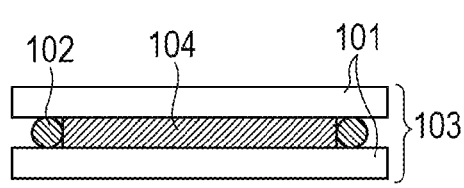
FIGS. 1A to 1G are each a cross-sectional view showing a method for manufacturing a lens according to a first embodiment.

Hereinafter, embodiments of the present invention will be described in detail.

A method for manufacturing a lens according to this embodiment has the following steps:
(A) a first step of contacting a monomer with a structural member of a polymer, the monomer and a material obtained by polymerization of the monomer showing refractive indices which are different from the refractive index of the polymer;
(B) a second step of diffusing the contacted monomer in the structural member; and
(C) a third step of polymerizing the monomer.

In addition, the method for manufacturing a lens according to this embodiment further includes the steps of, in the second step, irradiating the structural member with light and measuring the intensity of the light passing through the structural member in a predetermined region.

First, in the first and second steps, the monomer (hereinafter, simply referred to as "monomer" in some cases), the refractive indices of the monomer and a material obtained by polymerization of the monomer being different from the refractive index of the polymer, is diffused in the structural member from a surface portion to a central portion thereof. When the monomer is being diffused, among the surfaces of the structural member of the polymer, light is irradiated on at least 50% of one surface parallel to the diffusion direction of the monomer.

In addition, it is found that when at least 50% of one of the surfaces of the structural member which is parallel to the diffusion direction of the monomer is irradiated with light at the same time, a desired refractive index distribution is formed over the entire lens. On the other hand, when thin light beams such as laser beams are used, it may not be detected that a desired refractive index distribution is not formed over the entire lens in some cases such that a refractive index distribution is formed in a certain portion but is not formed in the other portion.

In addition, the parallel surface of the above "surface parallel to the diffusion direction of the monomer" includes an approximately parallel surface and may be different from a mathematically defined strict parallel surface as long as the advantages of the present invention can be obtained. When light is irradiated, among the surfaces of the structural member of the polymer, at least 90% of one surface parallel to the diffusion direction of the monomer is preferably irradiated with light, and at least 99% of one surface is more preferably irradiated therewith.

In addition, the predetermined region is preferably located on the optical axis of the lens having a refractive index distribution.

As described above, in the method for manufacturing a lens according to this embodiment, when the diffusion of the monomer progresses to a necessary level to obtain a lens having a desired refractive index distribution, the polymerization of the monomer is started. Accordingly, even when the progression rate of the diffusion of the monomer is changed due to a sudden change in temperature thereof during the diffusion step, or even when manufacturing is performed under conditions in which temperature control is difficult to perform, a lens having a desired refractive index distribution can be obtained.

In this method, although a cylindrical, a cubic, or a rectangular parallelepiped shape may be mentioned as the shape of the structural member of the polymer, the shape is not limited thereto. In addition, materials which can be used as the above polymer and monomer will be described in the following first embodiment.

First Embodiment

A method for manufacturing a lens having a refractive index distribution according to a first embodiment has the following steps. They are: a first step (1) of contacting a monomer with a peripheral portion of a cylindrical structural member of a polymer, the monomer and a material obtained by polymerization of the monomer showing refractive indices which are different from the refractive index of the polymer; a second step (2) of holding the monomer for a predetermined time for diffusion thereof from the peripheral portion to a central portion of the cylindrical structural member so as to form a refractive index distribution; and a third step (3) of polymerizing the monomer.

In addition, the method described above further has the following steps (4) and (5), and when the intensity of light measured in the step (5) reaches a predetermined value, the third step is started. The step (4) is a step of irradiating light on at least 50% of one flat surface of the structural member, the step (5) is a step of measuring the intensity of the light passing through the structural member in a predetermined region, and these two steps are performed while the monomer is diffused in the second step.

In the step (4), when light is irradiated, at least 90% of one flat surface of the structural member is preferably irradiated with light, and at least 99% of one flat surface is more preferably irradiated therewith.

Hereinafter, the above steps will be described in detail with reference to FIGS. 1A to 1G.

(Step (1))

First, the cylindrical structural member of the polymer is prepared. This structural member may be formed by any method. For example, a casting cell 103 as shown in FIG. 1A may be formed as a casting mold. In this embodiment, the casting cell is a cylindrical mold formed of 2 transparent substrates 101 and a circular gasket 102 provided therebetween. A first monomer 104 is injected inside this casting cell 103.

Figure 1B:
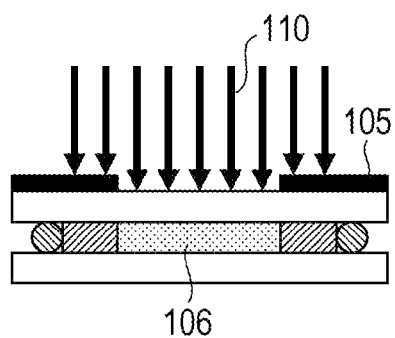
Figure 1C:
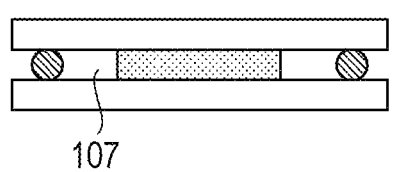

Next, a photomask 105 having a circular transparent site at a central portion is provided on one main surface of the casting cell and is irradiated with radiation 110. As a result, at a portion exposed to the radiation 110, a cylindrical structural member 106 of a polymer is formed, and at a portion not exposed, the first monomer, which is not polymerized, remains (FIG. 1B). Next, by removing the non-polymerized first monomer, the cylindrical structural member 106 of the polymer can be formed (FIG. 1C). In this embodiment, the first monomer may also be polymerized by thermal polymerization.

In this embodiment, the polymer forming the cylindrical structural member 106 is preferably in the form of gel. The reason for this is that when the structural member is in the form of gel, a second monomer is likely to be diffused in the cylindrical polymer.

In the case in which the complex viscosity is 10,000 Pa·s or more, in a holding step which will be described below, the progress of diffusion of the second monomer may become slow in some cases.

Figure 1D:
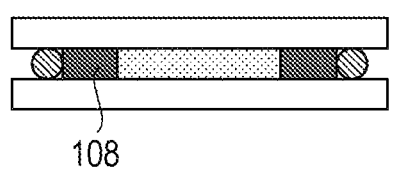
Figure 1E:
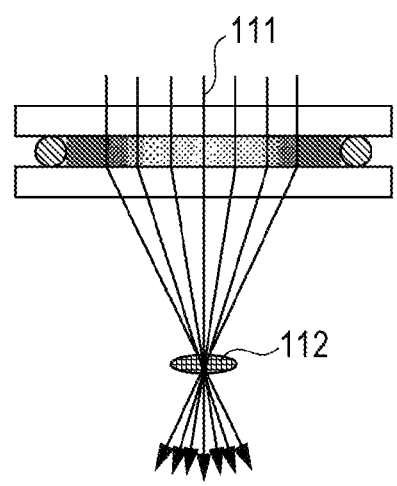

Next, a second monomer 108 is injected into a space 107 formed by removing the non-polymerized first monomer so as to be in contact with the peripheral portion of the cylindrical structural member 106 of the polymer (FIG. 1D). However, as the second monomer, a monomer, the refractive indices of the monomer and a material obtained by polymerization of the monomer being different from the refractive index of the polymer, is used.

In this embodiment, when the first monomer 104 is injected into the casting cell 103, for example, a radiation polymerization initiator, fine particles, a photosensitizer, and/or a thermal polymerization initiator may be simultaneously injected. In addition, when the second monomer 108 is injected into the casting cell 103, as in the case described above, for example, a radiation polymerization initiator, fine particles, a photosensitizer, and/or a thermal polymerization initiator may also be simultaneously injected.

In the first step, in order to form a lens having a uniform thickness, at least one spacer having a thickness approximately equal to that of the gasket is preferably inserted between the substrates 101 together with the gasket. In addition, if necessary, the casting cell is fixed, for example, with clips each having a spring, and the first monomer can be injected into the space of the casting cell using a syringe needle or the like. As a transparent substrate, for example, known materials, such as quartz, glass, transparent resins including a silicone resin, a fluorinated resin, an acrylic resin, a polycarbonate resin, and a polyimide, sapphire, and diamond may be mentioned. In order to easily remove the non-polymerized first monomer and inject the second monomer, after the first monomer is injected, the syringe needle is preferably not to be removed from the casting cell. In addition, when the non-polymerized first monomer is removed, and/or the second monomer is injected, if necessary, heating and/or pressuring may also be performed.

Furthermore, in order to easily release a lens as a final product from the casting cell, the surface thereof is preferably processed with a release agent beforehand. A release agent treatment is performed by applying a release agent, such as a fluorinated resin, a silicone resin, or a fatty acid ester, for example, using a spray, a dipping, or a spin coating method, followed by heating, if needed. In addition, an excessive release agent may be removed by solvent cleaning or wiping.

Although radiation to be irradiated is selected according to a sensitivity wavelength of the first monomer to be used, for example, ultraviolet lights having a wavelength of approximately 200 to 400 nm, X-rays, and electron beams may be appropriately selected for the use. Since many and various types of photosensitive compounds having sensitivity to ultraviolet lights can be easily available as the first monomer, the radiation to be irradiated is preferably ultraviolet lights. In addition, as a radiation irradiation device which irradiates ultraviolet lights, for example, there may be mentioned a high pressure mercury lamp, an ultrahigh pressure mercury lamp, a low pressure mercury lamp, a deep-UV lamp, a carbon-arc lamp, a chemical lamp, a metal halide lamp, and a xenon lamp, and an ultrahigh pressure mercury lamp is particularly preferable. These types of radiation may be used alone or in combination.

In addition, although as a method for partially polymerizing the first monomer, the photomask 105 having a transparent site at the central portion thereof was used in this embodiment, any types of maskings may also be used as long as radiation is to be irradiated in a circular form, or radiation which is irradiated in a circular form may also be used. In addition, when a lens having a shape other than a cylindrical shape, such as a rectangular parallelepiped shape, is formed, a photomask having a square or rectangular transparent site may also be used.

(Step (2))

Next, the second monomer 108 thus contacted is held for a predetermined time for diffusion thereof so as to form a refractive index distribution from the peripheral portion toward the central portion of the cylindrical structural member 106 of the polymer. In this embodiment, the predetermined time is a diffusion time of the second monomer required to obtain a lens having a desired refractive index distribution.

(Step (4))

While the second monomer 108 is diffused in Step (2), light (hereinafter, referred to as "reference light" in some cases) 111 for monitoring the refractive index distribution is irradiated on the main surface of the casting cell. For example, when the refractive index of the polymer is higher than that of the polymerized second monomer 108, as the diffusion of the second monomer 108 progresses, the focal distance becomes closer to a lens from the infinity. As a result, the intensity of light is increased.

On the other hand, when the refractive index of the polymer is lower than that of the polymerized second monomer 108, the intensity of light is decreased as the diffusion of the second monomer progresses. As described above, by the intensity of light, the refractive index distribution of the sample in the casting cell can be monitored.

In this embodiment, the intensity of light refers, for example, to one of the illuminance (lx), the luminance (cd/m$^2$), the irradiance (W/m$^2$), and the radiance (W·sr$^{-1}$·m$^{-2}$·Hz$^{-1}$, W·sr$^{-1}$·m$^{-3}$) of light. For the illuminance and the luminance, the brightness is measured, and for the irradiance and the radiance, energy (workload) is measured.

However, when the first monomer 104 and the second monomer 108 are each a photopolymerizable monomer, this reference light must be light which causes no polymerization of both of them. The photopolymerizable monomer indicates a monomer to be polymerized when being irradiated with light. In this embodiment, the light causing no polymerization indicates light which causes substantially no polymerization even if the first and the second monomers are irradiated therewith. The above "substantially no polymerization" indicates that even if light irradiation is continuously performed for 24 hours, the degree of polymerization of the first and the second monomers is 10% or less.

(Step (5))

In this step, the intensity of the reference light passing through the casting cell is measured. Since the intensity of light changes as the refractive index distribution changes, the intensity of light is monitored in real time. When the measured intensity of light reaches the intensity of light obtained beforehand by calculation corresponding to a desired refractive index distribution, the following step (6) is to be started. In addition, the intensity of light can be measured in a predetermined region. The predetermined region is a position at which the change in intensity of light can be detected before and after a lens having a desired refractive index distribution is formed. In addition, the predetermined region may be a region at which the change in refractive index distribution can be detected and may be a predetermined point, a predetermined line, or a predetermined surface.
(Step (3))

Figure 1F:
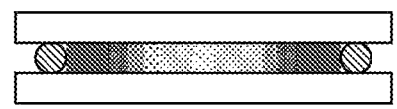

In this step, when the intensity of the light thus measured reaches a predetermined value, at least one of heating and irradiation of radiation is performed so as to stop the diffusion of the second monomer, and the second monomer is cured by polymerization (FIG. 1F)

For the irradiation of radiation, the radiation used for polymerization of the first monomer can be used. For the heating, a known device, such as an oven or a hot plate, can be used. Either the irradiation of radiation or the heating is preferably sufficiently performed to obtain mechanical properties and environmental stability of a lens which is finally obtained.

Figure 1G:
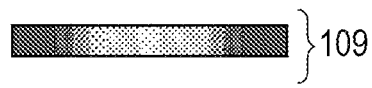

Finally, a lens 109 having a refractive index distribution, which is the target product, is removed from the inside of the casting cell (FIG. 1G).

In addition, the method for manufacturing a lens having a refractive index distribution according to this embodiment may include at least one step other than those described above.
(Method for Deriving Illuminance from Refractive Index Distribution)

Figure 2:
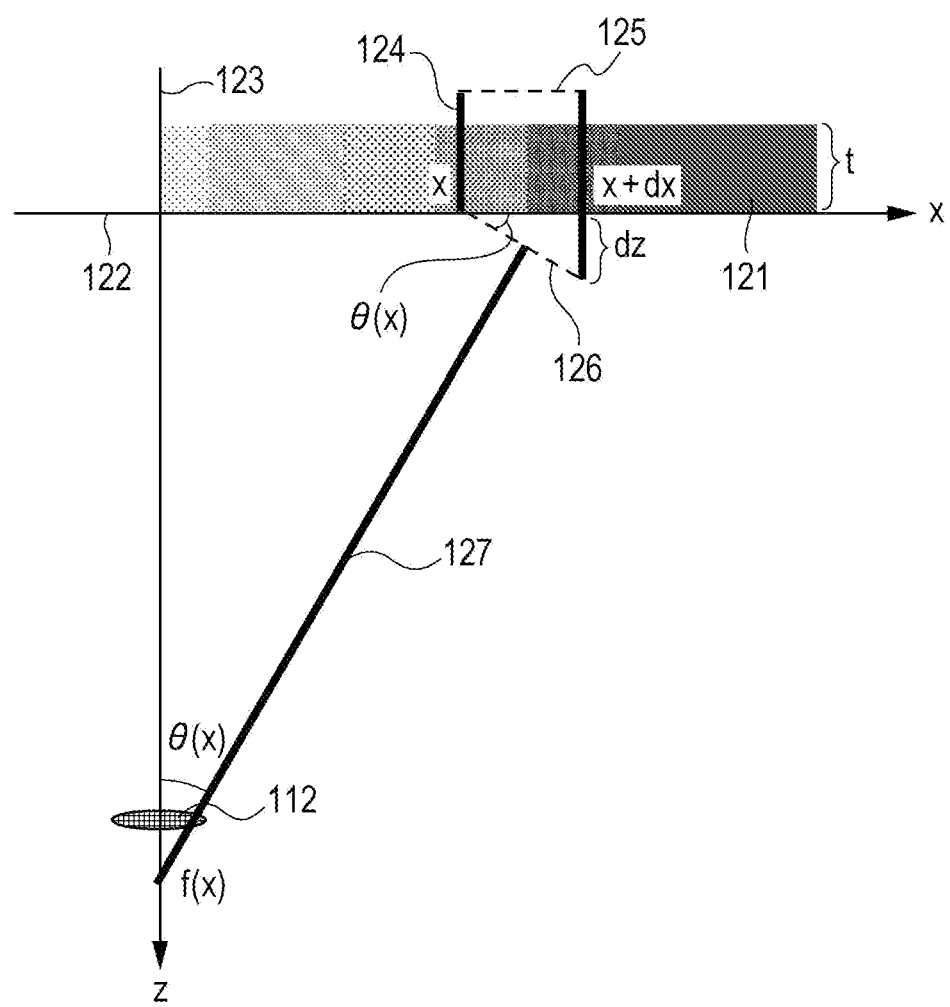
FIG. 2 is a view illustrating a method for deriving the illuminance from a refractive index distribution.

Hereinafter, a method for deriving the intensity from the refractive index distribution will be described with reference to FIG. 2. As shown in FIG. 2, an x-axis is taken from the center of a sample 121 having a refractive index distribution to a radial direction 122, and a z-axis is taken in a direction 123 perpendicular to the x-axis. In addition, the refractive index at a position x is represented by n(x), and the thickness of the sample is represented by t. Furthermore, reference numerals 125, 126, and 127 indicate a wave-front of an incident light, a wave-front of an outgoing light, and a trajectory of light, respectively.

In addition, it is assumed that light 124 is incident perpendicularly on the position x from a reference light irradiation device. The light is bent by an angle θ(x) because of a light path difference dz produced from the refractive index n(x) at the position x and a refractive index n(x+dx) at a position x+dx apart from the position x by a minute distance dx. In this case, the following equations are true.

$$dz = t \cdot (n(x) - n(x + dx)) \quad (1)$$

$$\tan(\theta(x)) = \frac{dz}{dx} \quad (2)$$

Light passing through the sample intersects the z axis at a position f(x) at this angle θ(x). In this case, the following equation is true.

$$f(x) = \frac{x}{\tan(\theta(x))} \quad (3)$$

In addition, a predetermined region is set at an arbitrary position opposite to the reference light irradiation device with the sample interposed therebetween, and the light intensity measurement device 112 is provided in this predetermined region. The incident light is regarded as uniform parallel light beams, and a predetermined number of light beams are arbitrarily provided per unit area. Ray tracing is performed on the reference light (all light beams) incident on the region in which the refractive index distribution is formed, and the number of light beams passing through the light intensity measurement device placed in the predetermined region is regarded as the intensity of light at this position. By deriving the intensity of light for every change in refractive index distribution with the progress of diffusion, the change in refractive index distribution and the change in intensity of light can be related to each other.

For example, when the refractive index distribution changes with time from the start of diffusion, since the relationship between the intensity of light and the time from the start of the diffusion can be obtained by the above calculation, the relationship between the refractive index distribution and the intensity of light can be obtained. Accordingly, the correspondence relationship between a desired refractive index distribution and the intensity of light is calculated beforehand by the method described above. As described above, a lens having a desired refractive index distribution can be manufactured without performing temperature control.

Hereinafter, materials used for the method for manufacturing a lens having a refractive index distribution according to this embodiment will be described.
(Polymer)

In this embodiment, as a polymer for the cylindrical structural member formed of a polymer, polymers obtained by polymerization of each following first monomer can be used, and a blend polymer containing at least two types of polymers may also be used. In addition, copolymers obtained by polymerization of the following first monomers may also be used. Furthermore, a blend polymer of a polymer and a copolymer may also be used.
(First Monomer)

In addition, as the first monomer, a radical polymerizable monomer or a cationic polymerizable monomer may be mentioned by way of example. As the radical polymerizable monomer, a compound having at least one acryloyl group or methacryloyl group is preferable. As the cationic polymerizable monomer, a compound having at least one vinyl ether group, epoxy group, or oxetanyl group is preferable.

As a monofunctional (meth)acrylic compound having one acryloyl group or methacryloyl group, for example, there may be mentioned phenoxyethyl(meth)acrylate, phenoxy-2-methylethyl(meth)acrylate, phenoxyethoxyethyl (meth)acrylate, 3-phenoxy-2-hydroxypropyl(meth)acrylate, 2-phenylphenoxyethyl(meth)acrylate, 4-phenylphenoxyethyl (meth)acrylate, 3-(2-phenylphenyl)-2-hydroxypropyl (meth) acrylate, (meth)acrylate of p-cumylphenol reacted with ethylene oxide, 2-bromophenoxyethyl(meth)acrylate, 2,4-dibromophenoxyethyl(meth)acrylate, 2,4,6-tribromophenoxyethyl(meth)acrylate, phenoxy(meth) acrylate modified with at least two moles of ethylene oxide and/or propylene oxide, polyoxyethylene nonylphenyl ether (meth)acrylate, isobornyl(meth)acrylate, bornyl (meth)acrylate, tricyclodecanyl(meth)acrylate, dicyclopentanyl(meth) acrylate, dicyclopentenyl (meth)acrylate, cyclohexyl(meth) acrylate, 4-butylcyclohexyl (meth)acrylate, acryloyl morpholine, 2-hydroxyethyl (meth)acrylate, 2-hydroxypropyl(meth)acrylate, 2-hydroxybutyl(meth)acrylate, methyl (meth)acrylate, ethyl (meth)acrylate, propyl(meth)acrylate, isopropyl (meth)acrylate, butyl(meth)acrylate, amyl(meth)acrylate, isobutyl(meth)acrylate, t-butyl(meth)acrylate, pentyl (meth)acrylate, isoamyl(meth)acrylate, hexyl(meth)acrylate, heptyl(meth)acrylate, octyl(meth)acrylate, isooctyl (meth)acrylate, 2-ethylhexyl(meth)acrylate, nonyl (meth) acrylate, decyl(meth)acrylate, isodecyl (meth)acrylate, undecyl(meth)acrylate, dodecyl (meth)acrylate, lauryl(meth) acrylate, stearyl (meth)acrylate, isostearyl(meth)acrylate, benzyl (meth)acrylate, tetrahydrofurfuryl(meth)acrylate, butoxy ethyl(meth)acrylate, ethoxy diethylene glycol (meth) acrylate, polyethylene glycol mono(meth)acrylate, polypropylene glycol mono(meth)acrylate, methoxy ethylene glycol (meth)acrylate, ethoxy ethyl(meth)acrylate, methoxy polyethylene glycol (meth)acrylate, methoxy polypropylene glycol (meth)acrylate, diacetone (meth)acrylamide, isobutoxy methyl(meth)acrylamide, N,N-dimethyl(meth)acrylamide, t-octyl (meth)acrylamide, dimethyl aminoethyl(meth)acrylate, diethyl aminoethyl(meth)acrylate, 7-amino-3,7-dimethyloctyl (meth)acrylate, N,N-diethyl(meth)acrylamide, and N,N-dimethyl aminopropyl(meth)acrylamide; however, the monofunctional (meth)acrylic compound is not limited to those mentioned above.

As a commercially available monofunctional (meth)acrylic compound, for example, there may be mentioned ARONIX M101, M102, M110, M111, M113, M117, M5700, TO-1317, M120, M150, and M156 (manufactured by TOAGOSEI CO., LTD.); LA, IBXA, 2-MTA, HPA, and biscoat #150, #155, #158, #190, #192, #193, #220, #2000, #2100, and #2150 (manufactured by Osaka Organic Chemical Industry Ltd.); LIGHT ACRYLATE BO-A, EC-A, DMP-A, THF-A, HOP-A, HOA-MPE, HOA-MPL, PO-A, P-200A, NP-4EA, NP-8EA, and epoxy ester M-600A (manufactured by Kyoeisha Chemical Co., Ltd.); KAYARAD TC110S, R-564, and R-128H (manufactured by Nippon Kayaku Co., Ltd.); NK ester AMP-10G and AMP-20G (manufactured by Shin-Nakamura Chemical Co., Ltd.); FA-511A, 512A, and 513A (manufactured by Hitachi Chemical Co., Ltd.); PHE, CEA, PHE-2, PHE-4, BR-31, BR-31M, and BR-32 (manufactured by Dai-Ichi Kogyo Seiyaku Co., Ltd.), VP (manufactured by BASF); and ACMO, DMAA, and DMAPAA (manufactured by Kohjin Co., Ltd.); however, the commercially available monofunctional (meth)acrylic compound is not limited to those mentioned above.

As a polyfunctional (meth)acrylic compound having at least two acryloyl group or methacryloyl group, for example, there may be mentioned trimethylol propane di(meth)acrylate, trimethylol propane tri(meth)acrylate, EO modified trimethylol propane tri(meth)acrylate, PO modified trimethylol propane tri(meth)acrylate, EO/PO modified trimethylol propane tri(meth)acrylate, pentaerythritol tri(meth)acrylate, pentaerythritol tetra(meth)acrylate, ethylene glycol di(meth) acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, tris(2-hydroxy ethyl)isocyanurate tri(meth)acrylate, tris(acryloyloxy)isocyanurate, bis(hydroxymethyl)tricyclodecan di(meth)acrylate, dipentaerythritol penta(meth)acrylate, dipentaerythritol hexa(meth)acrylate, EO modified 2,2-bis (4-(meth)(acryloxy)phenyl)propane, PO modified 2,2-bis(4-(meth)(acryloxy)phenyl)propane, and EO/PO modified 2,2-bis(4-(meth)(acryloxy)phenyl)propane; however, the polyfunctional (meth)acrylic compound is not limited to those mentioned above.

The first monomers mentioned above may be used alone, or at least two types thereof may be used in combination. In addition, the (meth)acrylate mentioned above indicates an acrylate and a methacrylate corresponding thereto. The (meta)acryloyl group mentioned above indicates an acryloyl group and a methacryloyl group corresponding thereto, the EO indicates ethylene oxide, and the EO modified compound indicates a compound having a block structure of an ethylene oxide group. In addition, the PO indicates propylene oxide, and the PO modified compound indicates a compound having a block structure of a propylene oxide group.

As a commercially available polyfunctional (meth)acrylic compound, for example, there may be mentioned UPIMA-UV SA1002 and SA2007 (manufactured by Mitsubishi Chemical Corp.); Biscoat #195, #230, #215, #260, #335HP, #295, #300, #360, #700, GPT, and 3PA (manufactured by Osaka Organic Chemical Industry Ltd.); LIGHT ACRYLATE 4EG-A, 9EG-A, NP-A, DCP-A, BP-4EA, BP-4PA, TMP-A, PE-3A, PE-4A, and DPE-6A (manufactured by Kyoeisha Chemical Co., Ltd.); KAYARAD PET-30, TMPTA, R-604, DPHA, DPCA-20, -30, -60, -120, HX-620, D-310, and D-330 (manufactured by Nippon Kayaku Co., Ltd.); ARONIX M208, M210, M215, M220, M240, M305, M309, M310, M315, M325, M400 (manufactured by TOAGOSEI Co., Ltd.); and Ripoxy VR-77, VR-60, and VR-90 (manufactured by SHOWA HIGHPOLYMER CO., LTD); however, the commercially available polyfunctional (meth)acrylic compound is not limited to those mentioned above.

As a compound having one vinyl ether group, for example, there may be mentioned methyl vinyl ether, ethyl vinyl ether, propyl vinyl ether, N-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, (4-hydroxymethyl)cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether; however, the compound having one vinyl ether group is not limited to those mentioned above.

As a compound having at least two vinyl ether groups, for example, there may be mentioned divinyl ethers, such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers, such as trimethylolethane trivinyl ether, trimethylolpropane trivinyl ether, ditrimethylol propane tetravinyl ether, glycerol trivinyl ether, pentaerythritol tetravinyl ether, dipentaerythritol pentavinyl ether, dipentaerythritol hexavinyl ether, ethylene oxide adduct of trimethylolpropane trivinyl ether, propylene oxide adduct of trimethylolpropane trivinyl ether, ethylene oxide adduct of ditrimethylol propane tetravinyl ether, propylene oxide adduct of ditrimethylol propane tetravinyl ether, ethylene oxide adduct of pentaerythritol tetravinyl ether, propylene oxide adduct of pentaerythritol tetravinyl ether, ethylene oxide adduct of dipentaerythritol hexavinyl ether, and propylene oxide adduct of dipentaerythritol hexavinyl ether; however, the compound having at least two vinyl ether groups is not limited to those mentioned above.

As a compound having one epoxy group, for example, there may be mentioned phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyl oxymethyl cyclohexene oxide, 3-acryloyl oxymethyl cyclohexene oxide, and 3-vinylcyclohexene oxide; however, the compound having one epoxy group is not limited to those mentioned above.

As a compound having at least two epoxy groups, for example, there may be mentioned bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxycyclohexyl-5,5-spiro-3,4-epoxy)cyclohexane-metha-dioxane, bis(3,4-epoxycyclohexylmethyl)adipate, vinylcyclohexene oxide, 4-vinylepoxycyclohexane, bis((3,4-epoxy-6-methylcyclohexyl)methyl))adipate, 3,4-epoxy-6-methylcyclohexyl-3',4'-epoxy-6'-methylcyclohexane carboxylate, methylenebis(3,4-epoxy cyclohexane), dicyclopentadiene diepoxide, di(3,4-epoxycyclohexylmethyl) ether of ethylene glycol, ethylenebis(3,4-epoxycyclohexane carboxylate), epoxy hexahydrophthalic acid dioctyl, epoxy hexahydrophthalic acid di-2-ethylhexyl, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, 1,1,3-tetradecadiene dioxide, limonene dioxide, 1,2,7,8-diepoxyoctane, and 1,2,5,6-diepoxycyclooctane; however, the compound having at least two epoxy groups is not limited to those mentioned above.

As a compound having one oxetanyl group, for example, there may be mentioned 3-ethyl-3-hydroxymethyl oxetane, 3-(meth)allyloxymethyl-3-ethyl oxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyl diethylene glycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenyl (3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, and bornyl(3-ethyl-3-oxetanylmethyl) ether; however, the compound having one oxetanyl group is not limited those mentioned above.

As a compound having at least two oxetanyl groups, for example, there may be mentioned 3,7-bis(3-oxetanyl)-5-oxanonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanlymethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecane diyldimethylene(3-ethyl-3-oxetanylmethyl)ether, trimethylol propane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis (3-ethyl-3-oxetanylmethyl)ether, EO-modified hydrogenated bisphenol A bis(3-ethyl-3-oxetanylmethyl) ether, PO-modified hydrogenated bisphenol A bis(3-ethyl-3-oxetanylmethyl)ether, and EO-modified bisphenol F (3-ethyl-3-oxetanylmethyl)ether; however, the compound having at least two oxetanyl groups is not limited to those mentioned above.

In addition, in view of mechanical strengths and the like obtained by fully curing, as the first monomer component, a monofunctional monomer and a polyfunctional monomer are preferably used together in combination.

In addition, since handling, such as injection and suction, can be easily performed by a syringe, the first monomer is preferably in the form of liquid.

(Radiation Polymerization Initiator)

The radiation polymerization initiator is preferably a radiation sensitive radical generator when the first monomer is a radical polymerizable monomer and is preferably a radiation sensitive acid generator when the first monomer is a cationic polymerizable monomer. In addition, the radiation sensitive radical generator is a compound which, by irradiation of radiation, such as infrared lights, visible lights, ultraviolet lights, far ultraviolet lights, X-rays, and charged particle beams including electron beams, can start a chemical reaction, generates radicals, and start radical polymerization. As the compound described above, for example, there may be mentioned a substituted or non-substituted 2,4,5-triarylimidazole dimer, such as 2-(o-chlorophenyl)-4,5-diphenylimidazole dimer, 2-(o-chlorophenyl)-4,5-di(methoxyphenyl) imidazole dimer, 2-(o-fluorophenyl)-4,5-diphenylimidazole dimer, or 2-(o- or p-methoxyphenyl)-4,5-diphenyl imidazole dimer; a benzophenone derivative, such as N,N'-tetramethyl-4,4'-diaminobenzophenone (Michler's ketone), N,N'-tetraethyl-4,4'-diaminobenzophenone, 4-methoxy-4'-dimethylaminobenzophenone, 4-chlorobenzophenon, 4,4'-dimethoxybenzophenone, or 4,4'-diaminobenzophenone; an aromatic ketone derivative, such as 2-benzyl-2-dimethylamino-1-(4-morpholino-phenyl)-butane-1-one and 2-methyl-1-[4-(methylthio)phenyl]-2-morpholino propane-1-one; a quinone, such as 2-ethylanthraquinone, phenanthrenequinone, 2-t-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenantraquinone, 2-methyl-1,4-naphthoquinone, or 2,3-dimethylanthraquinone; a benzoin ether derivative, such as benzoin methyl ether, benzoin ethyl ether, or benzoin phenyl ether; a benzoin derivative, such as benzoin, methylbenzoin, ethylbenzoin, or propylbenzoin; a benzyl derivative, such as benzyl dimethyl ketal; an acridine derivative, such as 9-phenylacridine or 1,7-bis(9,9'-acridinyl)heptane; an N-phenylglycine derivative, such as N-phenylglycine; an acetophenone derivative, such as acetophenone, 3-methylacetophenone, acetophenone benzyl ketal, 1-hydroxy cyclohexyl phenyl ketone, or 2,2-dimethoxy-2-phenylacetophenone; a thioxanthone derivative, such as thioxanthone, diethyl thioxanthone, 2-isopropyl thioxanthone, or 2-chloro thioxanthone; xanthone, fluorenone, benzaldehyde, fluorene, anthraquinone, triphenylamine, carbazole, 1-(4-isopropylphenyl)-2-hydroxy-2-methylpropane-1-on, 2-hydroxy-2-methyl-1-phenylpropane-1-on, 2,4,6-trimethyl benzoyldiphenyl phosphine oxide, or bis-(2,6-dimethoxybenzoyl)-2,4,4-trimethyl pentylphosphine oxide. However, the compound described above is not limited to those mentioned above. Those materials may be used alone, or at least two types thereof may be used in combination.

As a commercially available radiation sensitive radical generator, for example, there may be mentioned Irgacure 184, 369, 651, 500, 819, 907, 784, 2959, CGI-1700, -1750, -1850, CG24-61, Darocur 1116 and 1173 (manufactured by Ciba Japan); Lucirin TPO, LR8893, and LR8970 (manufactured by BASF); and Uvecryl P36 (manufactured by UCB); however, the commercially available radiation sensitive radical initiator is not limited to those mentioned above.

The radiation sensitive acid generator is a compound which, by irradiation of radiation, such as infrared lights, visible lights, ultraviolet lights, far ultraviolet lights, X-rays, and charged particle beams including electron beams, can start a chemical reaction, generate an acid, and start cationic polymerization. As the compound described above, although an onium salt compound, a sulfone compound, a sulfonic acid ester compound, a sulfonimide compound, and a diazomethane compound may be mentioned by way of example, the compound is not limited to those mentioned above. In the present invention, an onium salt compound is preferably used.

As the onium salt compound, for example, there may be mentioned an iodonium salt, a sulfonium salt, a phosphonium salt, a diazonium salt, an ammonium salt, and a pyridinium salt. As particular examples of the onium salt compound, there may be mentioned bis(4-t-butylphenyl)iodonium perfluoro-n-butanesulfonate, bis(4-t-butylphenyl)iodonium trifluoromethanesulfonate, bis(4-t-butylphenyl)iodonium 2-trifluoromethyl benzenesulfonate, bis(4-t-butylphenyl) iodonium pyrenesulfonate, bis(4-t-butylphenyl)iodonium n-dodecylbenzenesulfonate, bis(4-t-butylphenyl)iodonium p-toluenesulfonate, bis(4-t-butylphenyl)iodonium benzenesulfonate, bis(4-t-butylphenyl)iodonium 10-camphorsulfonate, bis(4-t-butylphenyl)iodonium n-octanesulfonate, diphenyliodonium perfluoro-n-butanesulfonate, diphenyliodonium trifluoromethanesulfonate, diphenyliodonium 2-trifluoromethyl benzenesulfonate, diphenyliodonium pyrenesulfonate, diphenyliodonium n-dodecylbenzenesulfonate, diphenyliodonium p-toluenesulfonate, diphenyliodonium benzenesulfonate, diphenyliodonium 10-camphorsulfonate, diphenyliodonium n-octanesulfonate, triphenylsulfonium perfluoro-n-butanesulfonate, triphenylsulfonium trifluoromethanesulfonate, triphenylsulfonium 2-trifluoromethyl benzenesulfonate, triphenylsulfonium pyrenesulfonate, triphenylsulfonium n-dodecylbenzenesulfonate, triphenylsulfonium p-toluenesulfonate, triphenylsulfonium benzenesulfonate, triphenylsulfonium 10-camphorsulfonate, triphenylsulfonium n-octanesulfonate, diphenyl(4-t-butylphenyl) sulfonium perfluoro-n-butanesulfonate, diphenyl(4-t-butylphenyl)sulfonium trifluoromethanesulfonate, diphenyl(4-t-butylphenyl)sulfonium 2-trifluoromethyl benzenesulfonate, diphenyl(4-t-butylphenyl)sulfonium pyrenesulfonate, diphenyl(4-t-butylphenyl)sulfonium n-dodecylbenzenesulfonate, diphenyl(4-t-butylphenyl)sulfonium p-toluenesulfonate, diphenyl(4-t-butylphenyl)sulfonium benzenesulfonate, diphenyl(4-t-butylphenyl)sulfonium 10-camphorsulfonate, diphenyl(4-t-butylphenyl)sulfonium n-octanesulfonate, tris(4-methoxyphenyl)sulfonium perfluoro-n-butanesulfonate, tris(4-methoxyphenyl)sulfonium trifluoromethanesulfonate, tris(4-methoxyphenyl)sulfonium 2-trifluoromethyl benzenesulfonate, tris(4-methoxyphenyl)sulfonium pyrenesulfonate, tris(4-methoxyphenyl)sulfonium n-dodecylbenzenesulfonate, tris(4-methoxyphenyl) sulfonium p-toluenesulfonate, tris(4-methoxyphenyl) sulfonium benzenesulfonate, tris(4-methoxyphenyl) sulfonium 10-camphorsulfonate, and tris(4-methoxyphenyl) sulfonium n-octanesulfonate; however, the onium salt compound is not limited to those mentioned above.

As the sulfone compound, for example, a β-ketosulfone, a β-sulfonylsulfone, and α-diazo compounds thereof may be mentioned. As particular examples of the sulfone compound, although phenacyl phenyl sulfone, mesityl phenacyl sulfone, bis(phenylslufonyl)methane, and 4-trisphenacyl sulfone may be mentioned; however, the sulfone compound is not limited to those mentioned above.

As the sulfonic acid ester compound, for example, an alkylsulfonic acid ester, a haloalkylsulfonic acid ester, an arylsulfonic acid ester, and an iminosulfonate may be mentioned. As particular examples of the sulfonic acid ester compound, α-methylolbenzoin perfluoro-n-butanesulfonate, α-methylolbenzoin trifluoromethanesulfonate, α-methylolbenzoin 2-trifluoromethylbenzenesulfonate, and the like may be mentioned; however, the sulfonic acid ester compound is not limited thereto.

As particular examples of the sulfonimide compound, there may be mentioned N-(trifluoromethylsulfonyloxy)succinimide, N-(trifluoromethylsulfonyloxy)phtalimide, N-(trifluoromethylsulfonyloxy)diphenylmaleimide, N-(trifluoromethylsulfonyloxy)bicyclo[2.2.1]hept-5-ene-2,3-dicarboxylmide, N-(trifluoromethylsulfonyloxy)-7-oxabicyclo[2.2.1]hept-5-ene-2,3-dicarboxylmide, N-(trifluoromethylsulfonyloxy)bicyclo[2.2.1]heptane-5,6-oxy-2,3-dicarboxylmide, N-(trifluoromethylsulfonyloxy) naphthylimide, N-(10-camphorsulfonyloxy)succinimide, N-(10-camphorsulfonyloxy)phthalimide, N-(10-camphorsulfonyloxy)diphenylmaleimide, N-(10-camphorsulfonyloxy)bicyclo[2.2.1]hept-5-ene-2,3-dicarboxylmide, N-(10-camphorsulfonyloxy)-7-oxabicyclo[2.2.1]hept-5-ene-2,3-dicarboxylmide, N-(10-camphorsulfonyloxy)bicyclo[2.2.1]heptane-5,6-oxy-2,3-dicarboxylmide, N-(10-camphorsulfonyloxy)naphthylimide, N-(4-methylphenylsulfonyloxy)succinimide, N-(4-methylphenylsulfonyloxy)phthalimide, N-(4-methylphenylsulfonyloxy)diphenylmaleimide, N-(4-methylphenylsulfonyloxy)bicyclo[2.2.1]hept-5-ene-2,3-dicarboxylmide, N-(4-methylphenylsulfonyloxy)-7-oxabicyclo[2.2.1]hept-5-ene-2,3-dicarboxylmide, N-(4-methylphenylsulfonyloxy)bicyclo[2.2.1]heptane-5,6-oxy-2,3-dicarboxylmide, N-(4-methylphenylsulfonyloxy) naphthylimide, N-(2-trifluoromethylphenylsulfonyloxy) succinimide, N-(2-trifluoromethylphenylsulfonyloxy) phthalimide, N-(2-trifluoromethylphenylsulfonyloxy) diphenylmaleimide, N-(2-trifluoromethylphenylsulfonyloxy)bicyclo[2.2.1]hept-5-ene-2,3-dicarboxylmide, N-(2-trifluoromethylphenylsulfonyloxy)-7-oxabicyclo[2.2.1]

hept-5-ene-2,3-dicarboxylmide, N-(2-trifluoromethylphenylsulfonyloxy)bicyclo[2.2.1]heptane-5,6-oxy-2,3-dicarboxylmide, N-(2-trifluoromethylphenylsulfonyloxy)naphthylimide, N-(4-fluorophenylsulfonyloxy)succinimide, N-(4-fluorophenyl) phthalimide, N-(4-fluorophenylsulfonyloxy) diphenylmaleimide, N-(4-fluorophenylsulfonyloxy)bicyclo [2.2.1]hept-5-ene-2,3-dicarboxylmide, N-(4-fluorophenylsulfonyloxy)-7-oxabicyclo[2.2.1]hept-5-ene-2,3-dicarboxylmide, N-(4-fluorophenylsulfonyloxy)bicyclo [2.2.1]heptane-5,6-oxy-2,3-dicarboxylmide, and N-(4-fluorophenylsulfonyloxy)naphthylimide; however, the sulfonimide compound is not limited to those mentioned above.

As particular examples of the diazomethane compound, there may be mentioned bis(trifluoromethylsulfonyl)diazomethane, bis(cyclohexylsulfonyl)diazomethane, bis(phenylslufonyl)diazomethane, bis(p-toluenesulfonyl)diazomethane, methylsulfonyl p-toluenesulfonyldiazomethane, (cyclohexylsulfonyl)(1,1-dimethylethylsulfonyl)diazomethane, and bis(1,1-dimethylethylsulfonyl)diazomethane; however, the diazomethane compound is not limited thereto.

Among those radiation sensitive acid generators, the onium salt compound is preferable. In this embodiment, the radiation sensitive acid generators may be used alone, or at least two types thereof may be used in combination.

The amount of the radiation sensitive polymerization initiator is preferably in a range of 0.01 to 10 percent by mass with respect to the total mass of the first monomer and is more preferably in a range of 0.1 to 3 percent by mass. The reason for this is that when the amount is less than 0.01 percent by mass, the polymerization rate of the first monomer is decreased, and the reaction efficiency thereof may become low in some cases. On the other hand, when the amount is more than 10 percent by mass, the polymerization and handling properties of the first monomer and the mechanical and optical properties of the polymer obtained therefrom may be degraded in some cases.

(Photosensitizer)

When the first monomer is a material to be polymerized with radiation, the addition of a photosensitizer thereto enables the first monomer to be polymerized with a smaller exposure amount. In this embodiment, the photosensitizer is a compound which is excited by absorption of light having a specific wavelength and which interacts with a radiation polymerization initiator. For example, a coumarin derivative, a benzophenone derivative, a thioxanthone derivative, an anthracene derivative, a carbazole derivative, and a perylene derivative may be mentioned; however, the photosensitizer is not limited thereto. The interaction in this case includes energy transfer and/or electron transfer from a photosensitizer in an excited state. A molar absorbance index of a photosensitizer component to an exposure wavelength is preferably higher than that of a radiation sensitive polymerization initiator component.

(Particles)

A material forming particles to be used in this embodiment is not particularly limited as long as being transparent to the above radiation and reference light and being uniformly dispersable in the first monomer, and an organic material, an inorganic material, or an organic-inorganic composite material may be used. In addition, the particles may be modified on the surfaces thereof.

As the material forming particles as described above, for example, there may be mentioned titanium oxide ($TiO_2$), titanium hydroxide, zirconium oxide ($ZrO_2$), tantalum oxide ($Ta_2O_5$), aluminum oxide ($Al_2O_3$), niobium oxide ($Nb_2O_5$), tin oxide ($SnO_2$), antimony oxide ($Sb_2O_5$), zinc oxide ($ZnO$), silicon oxide ($SiO_2$), indium tin oxide (ITO), indium oxide ($In_2O_3$), lanthanum trioxide ($La_2O_3$), gadolinium oxide ($Gd_2O_3$), hafnium oxide ($HfO_2$), erbium oxide ($Er_2O_3$), neodymium oxide ($Nd_2O_3$), cerium oxide ($CeO_2$), dysprosium oxide ($Dy_2O_3$), magnesium oxide (MgO), iron oxide ($Fe_2O_3$), iron hydroxide ($Fe(OH)_3$), gallium oxide ($Ga_2O_3$), gallium hydroxide ($Ga(OH)_3$), and a mixed oxide and a mixed hydroxides formed therefrom; however, the material forming particles is not limited to those mentioned above. In view of the stability, there are preferably used aluminum oxide, titanium oxide, niobium oxide, tin oxide, zinc oxide, silicon oxide, indium oxide, zirconium oxide, tantalum oxide, lanthanum oxide, gadolinium oxide, hafnium oxide, erbium oxide, neodymium oxide, cerium oxide, dysprosium oxide, a mixed oxide thereof, and a hydroxide formed from at least one of those mentioned above.

In addition, since the radiation and reference light are scattered when the diameter of particles is large, particles having a sufficiently smaller diameter than the wavelength of the radiation and reference light are preferably used. Furthermore, when a lens to be obtained is used for application which requires transparency similar to that of an optical lens, if the diameter of particles is large, the transmittance may be degraded in some cases due to the influence of light scattering. Accordingly, the average diameter of the particles used in this embodiment is preferably 50 nm or less and more preferably 20 nm or less.

In order to uniformly disperse the particles in the first monomer, it is preferable, for example, that when the particles are formed, chemical modification be performed on the surfaces thereof, or after the particles are formed, a dispersant be added. In addition, the particles may be formed from a single material, a mixture, or a composite. Furthermore, when a material, such as titanium oxide, having photocatalytic activity is used for the particles, in order to prevent decomposition of a resin caused by a reaction initiated thereby, if needed, the surfaces of the material may be coated with a silicone compound or the like in some cases.

The amount of the particles to be injected is changed in accordance with aimed optical and mechanical performances of a lens to be finally obtained. In addition, although depending on the types of particles and first monomer to be used, the mass of the particles is preferably approximately in a range of 1 to 50 percent by mass with respect to the first monomer component. In addition, particles to be dispersed may not be limited to one type of material and may contain a plurality of types of particles.

(Second Monomer)

In this embodiment, as the second monomer, a monomer may be selected from the monomers described in the above (first monomer) column as long as the refractive indices of the monomer and a material obtained by polymerization of the monomer are different from the refractive index of the polymer. That is, the refractive index of the polymer obtained by polymerizing the first monomer must be different from that of the second monomer, and the refractive index of the polymer obtained by polymerizing the first monomer must be different from that of the polymer obtained by polymerizing the second monomer. In addition, when the second monomer is injected into the casting cell, a radiation polymerization initiator, fine particles, a photosensitizer, a thermal polymerization initiator, and the like may also be simultaneously injected, and those may be selected from the radiation polymerization initiators, fine particles, photosensitizers, and thermal polymerization initiators mentioned above.

In addition, since handling, such as injection and suction, can be easily performed by a syringe, the second monomer is preferably in the form of liquid.

Second Embodiment

A method for manufacturing a lens having a refractive index distribution according to a second embodiment has the following steps.

They are: a first step (i) of contacting a monomer with a cubic or a rectangular parallelepiped structural member of a polymer on its first surface and second surface opposite thereto, the monomer and a material obtained by polymerization of the monomer showing refractive indices which are different from the refractive index of the polymer; a second step (ii) of holding the monomer thus contacted for a predetermined time for diffusion thereof from the first surface and the second surface to a central portion of the structural member so as to form a refractive index distribution; and a third step (iii) of polymerizing the monomer. In addition, the method described above further has the following steps (iv) and (v), and when the intensity of light measured in the step (v) reaches a predetermined value, the third step is started.

The step (iv) is a step of, while the monomer is diffused in the second step, irradiating one surface other than the first and the second surfaces of the structural member with light which causes no polymerization of the monomer, and the step (v) is a step of measuring the intensity of the light passing through the structural member in a predetermined region.

Figure 3A:
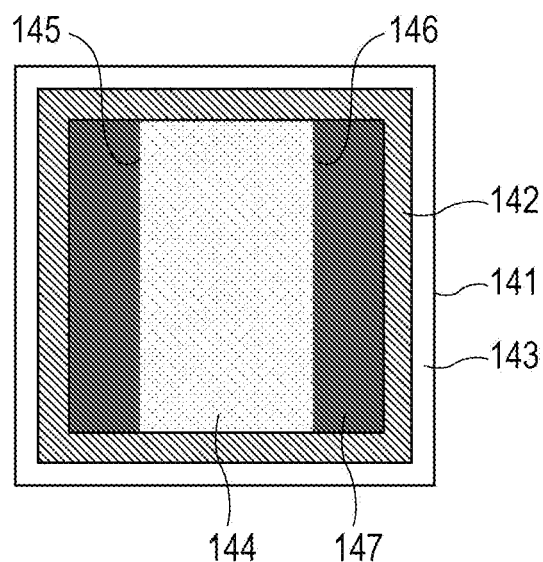
FIGS. 3A and 3B are each a view showing a method for manufacturing a lens according to a second embodiment.
Figure 3B:
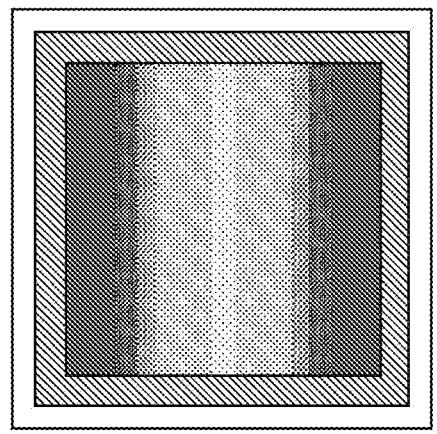

Hereinafter, the difference between the second and the first embodiments will be described, and description of the other portions which are not different from each other will be omitted. FIGS. 3A and 3B are each a view of a casting cell 141 (formed of 2 optical glass sheets 143 and a gasket 142 provided therebetween) when viewed in a main surface direction of each of the optical glass sheets 143. In FIGS. 3A and 3B, the optical glass sheet 143 is only partially shown so as to show the inside structure of the casting cell 141.

In this embodiment, first, a cubic or a rectangular parallelepiped structural member formed of a polymer (polymer obtained by polymerization of the first monomer) 144 is disposed in the casting cell 141. In addition, as shown in FIG. 3A, a second monomer 147, the refractive indices of the monomer and a material obtained by polymerization of the monomer being different from the refractive index of the polymer, is contacted with this structural member through an arbitrary surface (first surface 145) and a surface (second surface 146) opposite thereto of the structural member. As a result, the monomer is diffused from the first surface and the second surface to the central portion so as to form a refractive index distribution (FIG. 3B). When the monomer is being diffused, light which causes no polymerization of the monomer is irradiated on one surface other than the first and the second surfaces. The light thus irradiated passes through the structural member. When the intensity of light reaches a predetermined value, the polymerization of the second monomer is started, and the diffusion thereof is stopped. Through the steps described above, a so-called tabular cylindrical lens can be obtained.

Third Embodiment

Figure 6:
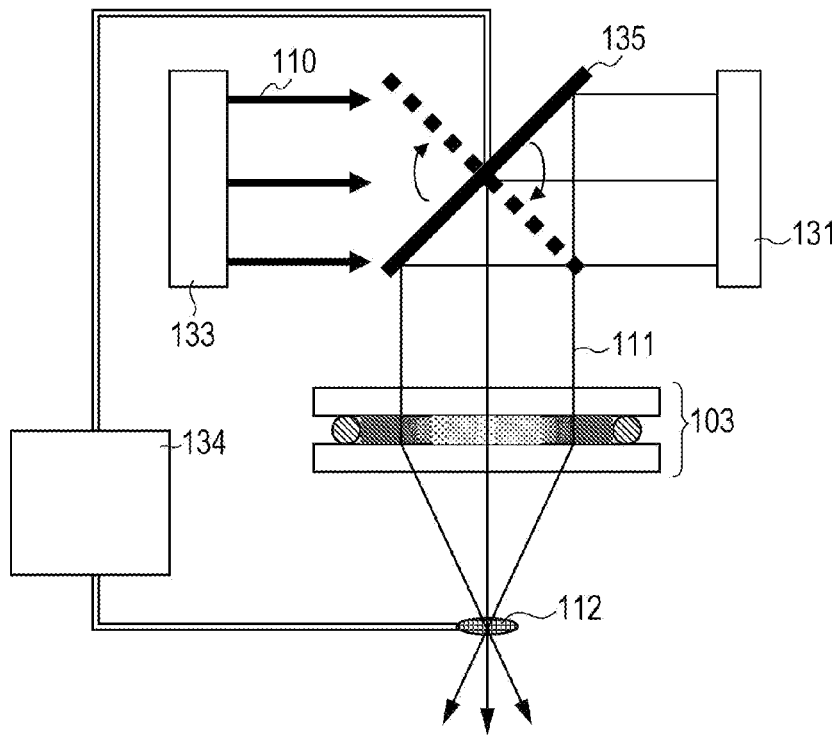
FIG. 6 is a view showing an apparatus for manufacturing a lens according to a third embodiment.
Figure 7:
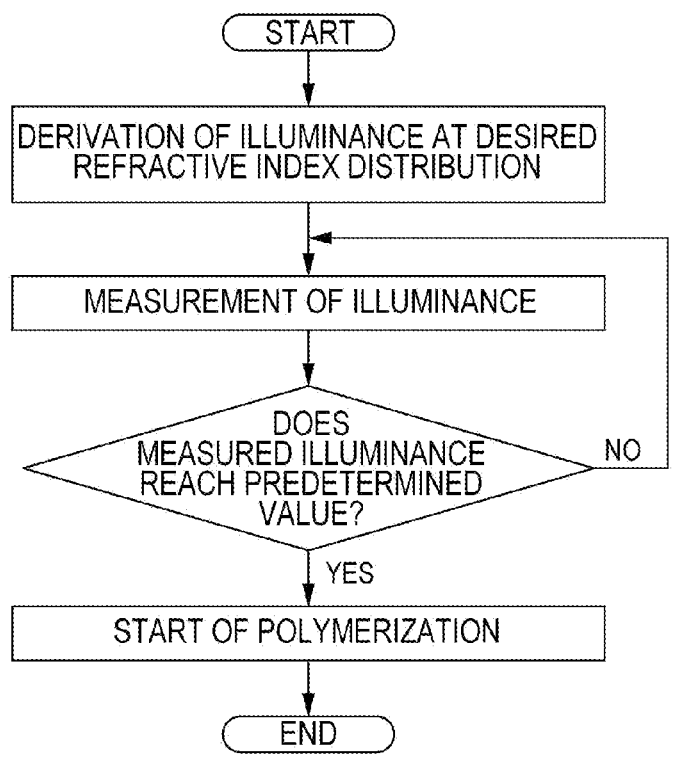
FIG. 7 is a flowchart of a process performed by the apparatus for manufacturing a lens according to the third embodiment.

An apparatus for manufacturing a lens having a refractive index distribution according to a third embodiment of the present invention will be described; however, the present invention is not limited thereto. One example of the structure of the apparatus for manufacturing a lens is shown in FIG. 6, and on example of a process is shown in a flowchart of FIG. 7. In this embodiment, as shown in FIG. 6, a reference light irradiation device 131 and the light intensity measurement device 112 are arranged with the casting cell 103 interposed therebetween. Furthermore, the light intensity measurement device 112 and a mirror 135 are connected to each other through a control device 134. The control device 134 is connected to the mirror 135. In addition, reference numeral 133 indicates a polymerization start device and is shown as a radiation irradiation device to irradiate radiation as shown in FIG. 6.

The light intensity measurement device 112 may be provided at any place as long as being provided at a position opposite to that of the reference light irradiation device 131 with the lens interposed therebetween and at a position at which the change in intensity of light passing through the casting cell 103 can be detected. In addition, in order to easily measure the intensity of light, the light intensity measurement device 112 is preferably located on the optical axis of the lens.

Whenever necessary, between the reference light irradiation device 131 and the casting cell 103 and/or between the casting cell and the light intensity measurement device 112, for example, an optical element, an aperture, and/or a filter having a known ray trajectory may be provided.

When the intensity of light measured by the light intensity measurement device 112 reaches a predetermined value, the mirror is controlled by the control device 134, and the casting cell is irradiated with radiation 110. By way of example, FIG. 6 shows an apparatus structure according to a method in which the light path of radiation is changed by controlling the rotation of the mirror 135 to switch between the radiation 110 and the reference light 111.

Next, individual portions of the apparatus for manufacturing a lens according to this embodiment will be described.
(Casting Cell)

A casting cell identical to that described above can be used.
(Light Irradiation Device)

As light (hereinafter referred to as "reference light" in some cases) irradiated from the light irradiation device, light which passes through the casting cell and has a wavelength to which the first and second monomers have no sensitivity is used. Since the refractive angle is changed in accordance with the wavelength of light, in particular, monochromatic light is preferably used. The coherence of light to be used is not particularly limited. In order to easily measure the intensity of the reference light after passing through the casting cell, the intensity of the light emitted from the light irradiation device is preferably uniform at least in the lens. In addition, by the reason described above, the light rays emitted from the light irradiation device are preferably parallel to the optical axis of the lens at least therein. As the light irradiation device, besides natural light such as sunlight, light obtained from a known device, such as a filament lamp, a fluorescent lamp, a light emitting diode, a laser beam source, can be used. In this case, light having a wavelength required for measurement of the intensity of light is preferably extracted using a filter or the like.
(Light Intensity Measurement Device)

As the light intensity measurement device, for example, a illuminance meter and a luminance meter, each of which measures the brightness of light, may be mentioned, and an irradiance meter and a spectral irradiance meter, each of which measures energy of light, may also be mentioned. In addition, imaging devices, such as a CCD (charge coupled device) image sensor and a CMOS (complementary metal oxide semiconductor) image sensor, and photoelectric transducers, such as a solar battery, may also be used. In addition, in order to improve measurement accuracy, an aperture is preferably applied to a light measurement portion (light receiving portion of the light intensity measurement device).

(Polymerization Start Device)

As the polymerization start device, any device may be used as long as it is capable of polymerizing the second monomer, and for example, either a radiation irradiation device or a heating device may be used. As the radiation irradiation device, the devices mentioned above may be used.

(Control Device)

The value measured by the light intensity measurement device is received and is compared with the intensity by the desired refractive index distribution. When the value thus measured reaches the intensity, the polymerization start device (the radiation irradiation device is used in this case) is controlled, and the step is shifted to a polymerization start step. The derivation of the intensity of light from the desired refractive index distribution may be incorporated in the control device, or after being separately derived, the intensity of light may be inputted into a device performing information processing. As the device performing information processing, for example, a computer and a control circuit formed of an analog and/or a digital circuit may be mentioned. As the control of the radiation irradiation device, for example, there may be mentioned a method of changing the light path using the mirror 135 shown in FIG. 6, a shutter, or the like; a method for changing the light irradiation device using a switch, and a method for switching the position of the light irradiation device and that of the radiation irradiation device.

Fourth Embodiment

Although a method for manufacturing an optical apparatus according to a fourth embodiment of the present invention will be described; however, the present invention is not limited thereto.

The method for manufacturing an optical apparatus according to this embodiment has the following steps. They are: a step (a) of providing a lens and a step (b) of providing an imaging device for imaging light passing through the lens provided in the step (a), and the lens is manufactured by the method for manufacturing a lens according to the present invention.

In this embodiment, since the method for manufacturing a lens is similar to that of the above embodiment, description thereof is omitted. In addition, as the imaging device, for example, a CCD image sensor and a CMOS image sensor may be mentioned. In addition, the method for manufacturing an optical apparatus according to this embodiment may include at least one step other than those described above.

The lens obtained by the method for manufacturing a lens according to the present invention may be used for an imaging element of a document reading apparatus functioning as an optical apparatus. In addition, as the optical apparatus according to this embodiment, for example, a camera may also be mentioned.

Examples

Although one example of the method for manufacturing a lens having a refractive index distribution according to the present invention will be described, the present invention is not limited thereto.

First, a polymerizable composition (A1) was prepared from 75 parts by weight of benzyl methacrylate (manufactured by Kyoeisha Chemical Co., Ltd.), 25 parts by weight of zirconium oxide (manufactured by Sumitomo Osaka Cement Co., Ltd.) having an average particle diameter of 7 nm, and 0.1 parts by weight of a photo radical generator (Irgacure 184, manufactured by Ciba Japan).

Next, a polymerizable composition (B2) was prepared from 72 parts by weight of tetrafluoropropyl methacrylate (manufactured by Osaka Organic Chemical Industry Ltd.), 18 parts by weight of methyl methacrylate (manufactured by Sigma-Aldrich Japan), 10 parts by weight of trimethylolpropane triacrylate (manufactured by Sigma-Aldrich Japan), and 0.1 parts by weight of a photo radical generator (Irgacure 184, manufactured by Ciba Japan).

In addition, aerosol type DAIFREE GA-6010 (manufactured by Daikin Industries, Ltd.) was sprayed as a release agent on 2 optical glass discs (70 mm in diameter and 5 mm in thickness), and an excessive release agent was wiped off by a cleaning cloth for optical apparatus. Furthermore, an circular O ring of a fluorinated rubber having a diameter of 35 mm and a thickness of 1.5 mm was provided between the 2 optical glass discs at a central portion thereof and was fixed with clips each having a spring at two positions facing each other, so that a casting cell was formed. The polymerizable composition (A1) was carefully injected into the casting cell using a disposal syringe so as not to allow air bubbles to remain.

In order to polymerize the monomer, the casting cell was irradiated with radiation. As a radiation irradiation device for polymerization, a UV light source EX250 including a 250 W ultrahigh pressure mercury lamp (manufactured by Hoya CANDEO OPTRONICS CORPORATION) was used. As a masking, a photomask 50 mm in diameter was prepared which had a circular transparent region 20 mm in diameter at a central portion. A shading material of the photomask was chromium, a base material was quartz, the transmittance of a shielding region was 0.01% or less at a wavelength of 365 nm, and the transmittance of the transparent region was 98%. Between the light source and the photomask, an ultraviolet transmission visible absorption filter (UTVAF-50S-36U) and a frost type diffusion plate (DFSQ1-50C02-800) (each of which was manufactured by Sigma Koki Co., Ltd.) were provided. The illuminance on the optical glass surface at an irradiation side of the casting cell was 30 mW/cm$^2$ at a wavelength of 365 nm. The irradiation was performed for 50 seconds at this illuminance.

Next, an empty disposal syringe was fitted to a syringe needle, and the uncured polymerizable composition (A1) was sucked out. Next, a disposal syringe filled with the polymerizable composition (B2) was fitted to the syringe needle, and the polymerizable composition (B2) was immediately injected into the casting cell.

The casting cell into which the polymerizable composition (B2) was injected was immediately set in a ray-tracing method type refractive-index-distribution measurement apparatus (Index Profile Analyzer: IPA5-C, manufactured by Advanced Technologies Co., Ltd.).

Figure 4:
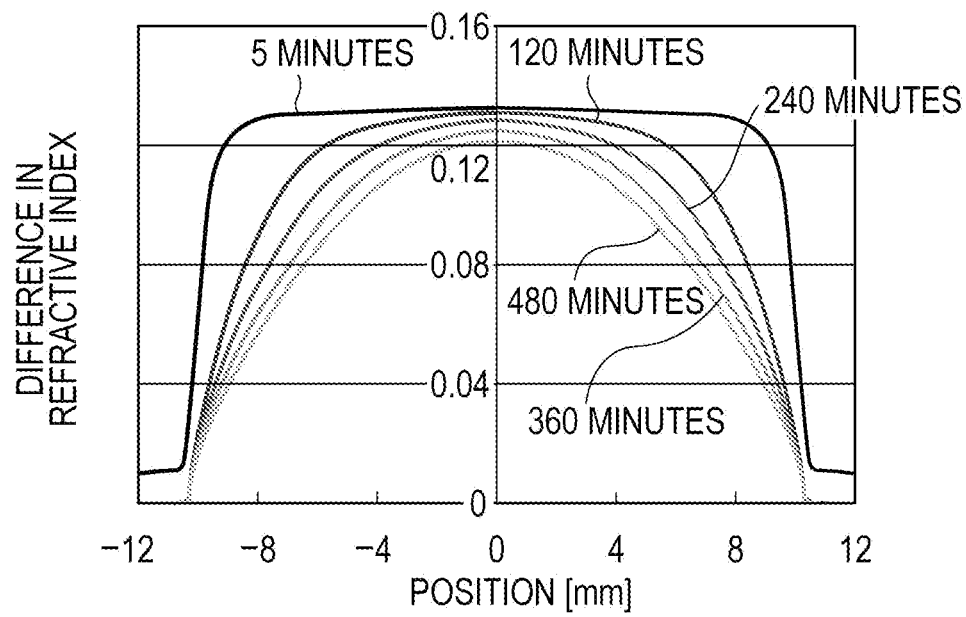
FIG. 4 is a graph showing the change in refractive index distribution with time obtained in an example of the present invention.

The refractive index distribution at a wavelength of 524.3 nm was measured 5 and 30 minutes after the polymerizable composition (B2) was injected. Subsequently, the measurement was performed for 480 minutes from the injection at regular intervals of 30 minutes, such as 60 minutes, 90 minutes, and so on. The results are shown in FIG. 4 (for ease of understanding of the graph, the refractive index distribution profiles obtained at 5, 120, 240, 360, and 480 minutes were selectively shown).

After the measurement was finished when 480 minutes passed, the entire surface was immediately irradiated with radiation to start the polymerization. At this stage, the illuminance on the optical glass surface was 30 mW/cm² at a wavelength of 365 nm. The irradiation was performed for 2 hours at this illuminance.

(Derivation of Relationship Between Diffusion Time and Illuminance)

A lens having a desired refractive index distribution can be obtained as described below.

Figure 5:
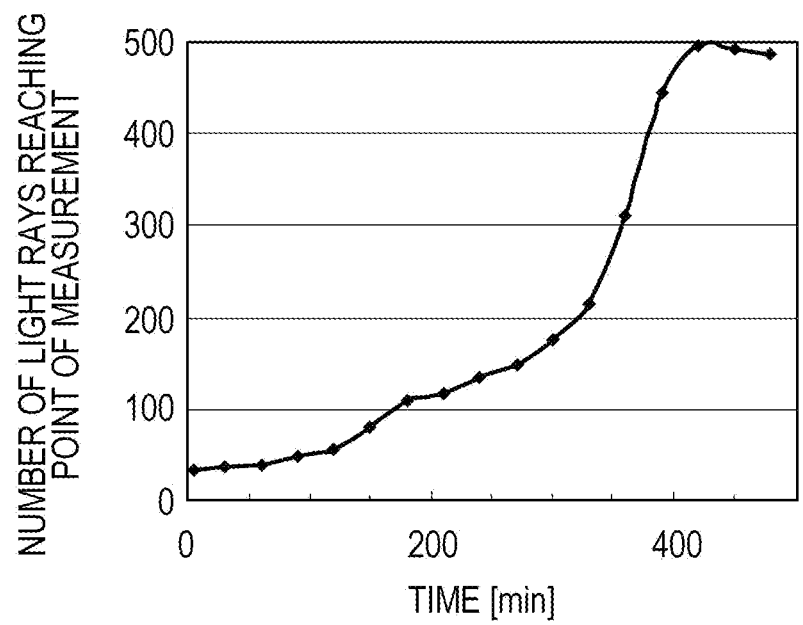
FIG. 5 is a graph showing the change in illuminance with time at a point of illuminance measurement obtained by calculation in the example of the present invention.

First, the correspondence relationship between the refractive index distribution profile of each lens shown in FIG. 4 and the number of light rays reaching the point of measurement of the light intensity measurement device was calculated. The relationship between the number of light rays reaching the point of measurement and the time from the start of injection of the polymerizable composition (B2), that is, the time for diffusion, obtained by this calculation, is shown in FIG. 5. In addition, for this calculation, the lens was divided into the finite elements. The division width corresponds to dx of Equation 1 and was set to 0.033 [mm]. In addition, the thickness t of the lens was set to 1.5 [mm]. It was assumed that light was incident perpendicular to the lens. It was also assumed that the light intensity measurement device was placed on the optical axis of the lens at a position 340 mm apart therefrom.

When it is intended, for example, to obtain from FIG. 5 a lens having a refractive index distribution profile at 360 minutes from the start shown in FIG. 4, the following steps may be performed. That is, it is found from FIG. 5 that after 360 minutes from the start of the diffusion, the number of light rays reaching the point of measurement is 310.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-203368, filed Sep. 10, 2010, which is hereby incorporated by reference herein in its entirety.

What is claimed is:

1. A method for manufacturing a lens having a refractive index distribution comprising:
    a step of contacting a monomer with a structural member of a polymer, the monomer and a material obtained by polymerization of the monomer showing refractive indices which are different from the refractive index of the polymer;
    a step of diffusing the contacted monomer in the structural member; and
    a step of polymerizing the monomer,
    wherein in the step of diffusing the contacted monomer in the structural member, the method further comprises the steps of irradiating light at a same time on at least 50% of one of the surfaces of the structural member which is parallel to the diffusion direction of the monomer, and measuring the intensity of the light passing through the structural member in a predetermined region, and when the measured intensity of the light reaches a predetermined value, the step of polymerizing the monomer is started.

2. The method for manufacturing a lens having a refractive index distribution according to claim 1,
    wherein the structural member of the polymer has a cylindrical shape,
    the step of contacting the monomer with the structural member of the polymer is a step of contacting the monomer with a peripheral portion of the structural member having a cylindrical shape,
    the step of diffusing the contacted monomer in the structural member is a step of diffusing the monomer from the peripheral portion of the structural member having a cylindrical shape toward a central portion thereof to form a refractive index distribution, and
    the step of irradiating light is a step of irradiating light on at least 50% of one flat surface of the structural member having a cylindrical shape.

3. The method for manufacturing a lens having a refractive index distribution according to claim 1,
    wherein the predetermined region is located on an optical axis of the lens having a refractive index distribution.

4. The method according to claim 1, wherein the polymer is a gel.

5. The method according to claim 1, wherein the light to irradiate causes substantially no polymerization of the monomer.

6. The method according to claim 1, wherein the predetermined region is a focal position of the lens.

* * * * *